June 26, 1923.
A. H. PEYCKE
1,459,745
BRAKE MECHANISM
Filed Oct. 18, 1920
3 Sheets-Sheet 2
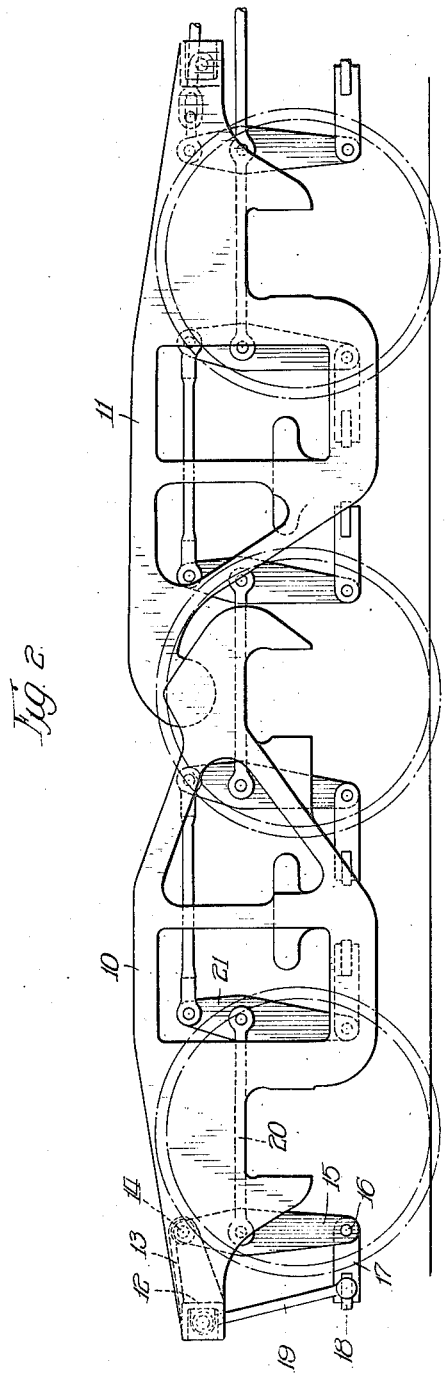
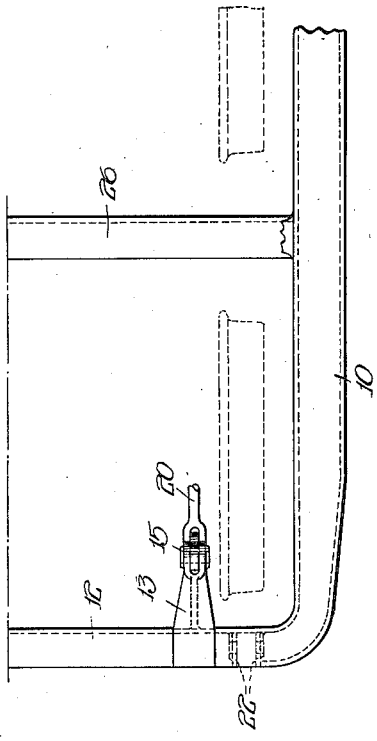
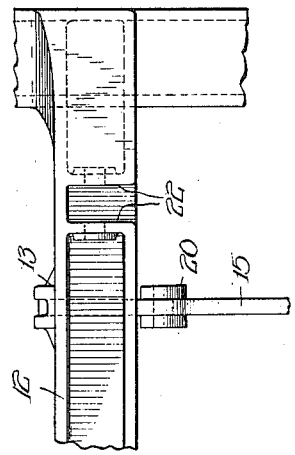

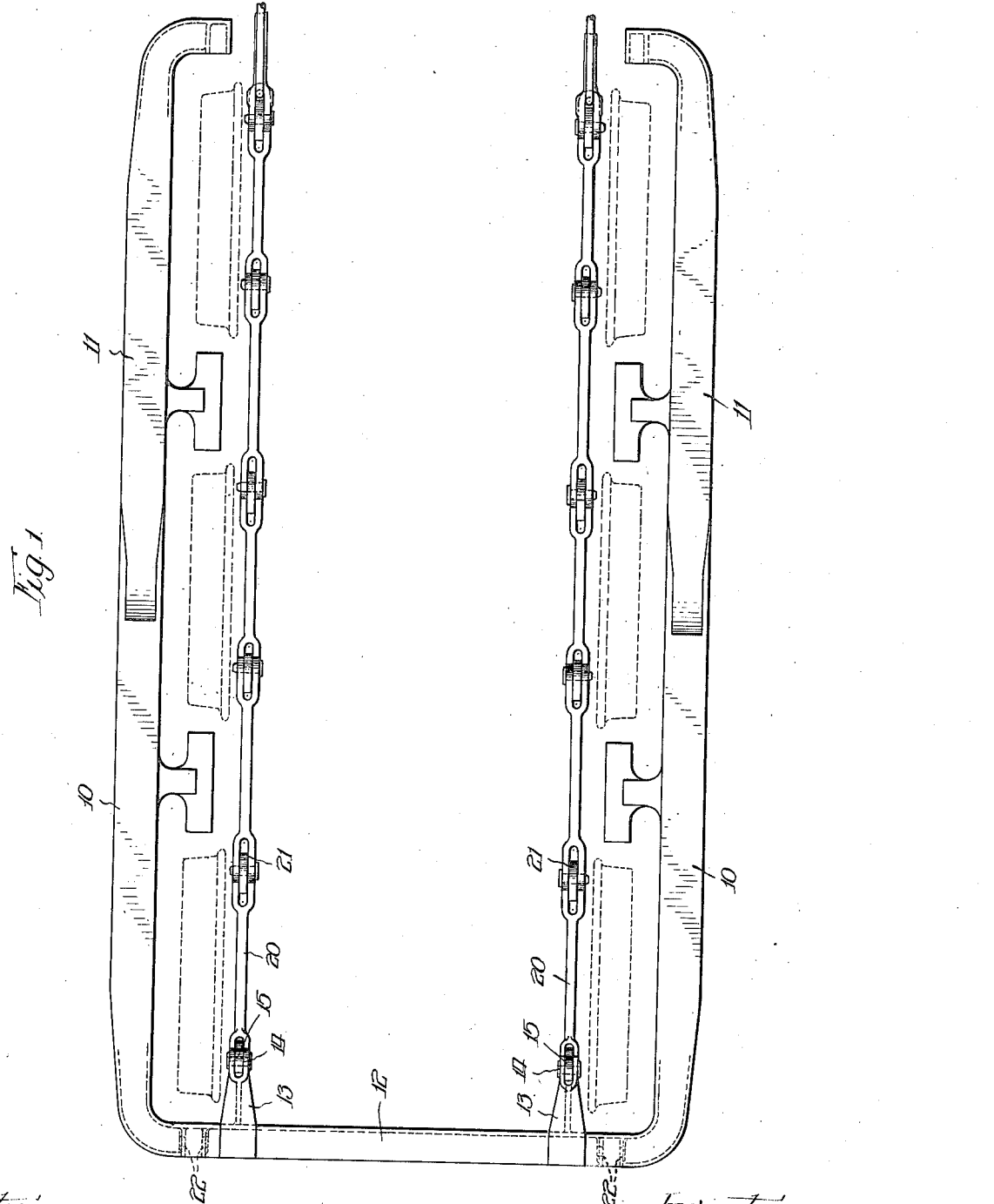

June 26, 1923.
A. H. PEYCKE
1,459,745
BRAKE MECHANISM
Filed Oct. 18, 1920
3 Sheets-Sheet 3
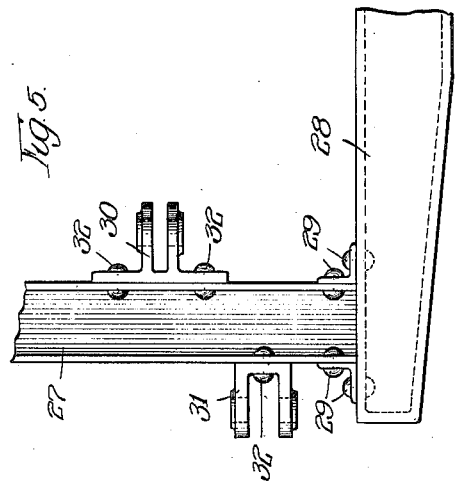
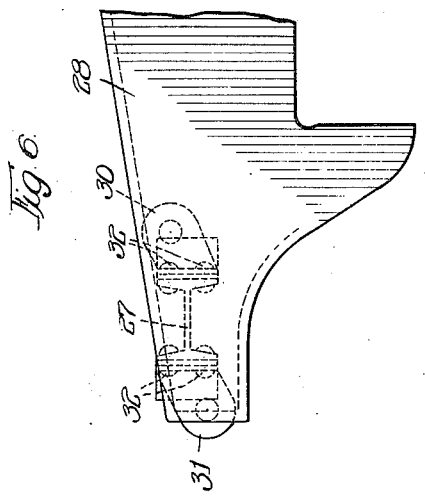
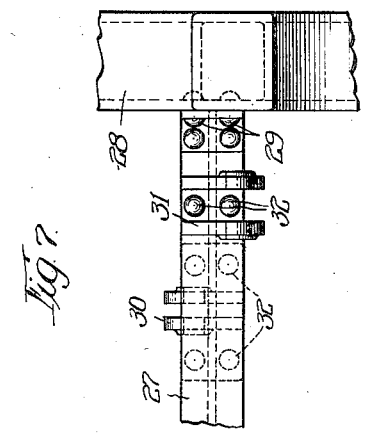
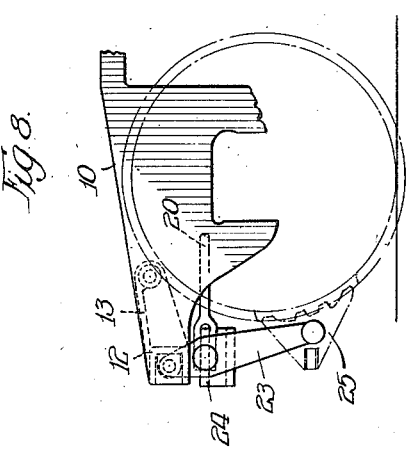
Witness:
N. Burkhardt
Inventor:
Armand H Peycke,
By Wilkinson, Huxley, Byron & Knight
Attys.

Patented June 26, 1923.

1,459,745

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

Application filed October 18, 1920. Serial No. 417,684.

*To all whom it may concern:*

Be it known that I, ARMAND H. PEYCKE, a citizen of the United States, residing at Chicago, in the county of Cook and State of Illinois, have invented certain new and useful Improvements in Brake Mechanism, of which the following is a specification.

This invention relates to brake mechanism.

One object of the invention is to provide a simple and efficient selective brake supporting arrangement whereby a lever may be placed in one position and used as a brake lever, and in another position and used as a combination brake hanger and lever.

Another object is to provide a selective brake supporting arrangement adapted to meet the requirements of service conditions.

These and other objects are accomplished by means of the arrangements shown on the accompanying sheets of drawings, in which—

Figure 1 is a top plan view of a railway car truck embodying my invention and showing clasp brake mechanism in which the lever at the dead end of the truck acts only as a dead lever mounted in one of the selective positions;

Figure 2 is a side elevation of the same arrangement;

Figure 3 is a fragmentary end view of the same arrangement;

Figure 4 is a fragmentary plan view of the same arrangement with the exception that the truck side frames are connected intermediate their ends;

Figure 5 is a top plan view of a modification of my invention in which the member connecting the side frames does not form an integral part of the side frames and has a plurality of separate brackets by means of which the lever or combined lever and hanger may be selectively mounted;

Figure 6 is a fragmentary side elevation of the same arrangement;

Figure 7 is a fragmentary end elevation of the same arrangement; and,

Figure 8 is a fragmentary side elevation of a truck side frame in which the supporting brackets are integrally formed, as shown in Figures 1 to 4, inclusive, but showing a combination brake lever and hanger mounted in one of the selective positions.

The various novel features of my invention will be apparent from the following description and drawings and will be particularly pointed out in the appended claims.

Referring first to Figures 1 to 4, inclusive, it will be noted that I have disclosed my invention in connection with a railway car truck having articulated side frame members 10 and 11, the oppositely arranged side frame members 10 being shown as integrally formed with an end cross connecting member 12. The oppositely arranged side frame members 11 may be pivotally connected to the side frame members 10 in any suitable manner. As shown in these figures, the end cross connecting member 12 is provided at each side with an integrally formed fulcrum bracket 13, to the outer end of each of which is pivotally connected at 14 the upper end of a dead brake lever 15, the lower end of which is pivotally connected at 16 to a brake beam fulcrum 17 extending back to a brake beam 18 supported by a hanger 19. Connected to an intermediate portion of the dead brake lever 15 is a tension rod 20 connected to a corresponding brake lever 21 forming a part of the clasp brake rigging in which all of the rods between the associated brake levers are in tension. Were the cross connecting member 12 not provided and the dead lever fulcrum bracket 13 secured to a laterally extending portion of a side frame which did not connect with the opposite side frame, the side frame would bulge outwardly intermediate its ends upon the application of the brakes. However, by providing the connecting member 12, the undesirable feature mentioned is overcome, and, accordingly, the fulcrum bracket 13 for the dead lever may be placed on the connecting member 12 a considerable distance from the side frame members. The connecting member 12 is also provided with flanges of a bracket portion 22 for the reception of a combination brake hanger and dead lever. Such a combination brake hanger and dead lever is shown at 23 in Figure 8, oppositely arranged dead levers being connected by a cross piece 24 and having at their lower ends brake heads 25 forming a part of a brake system, and, as shown in the figures of the drawings, a clasp brake system in which the rods connecting the levers are in tension. It is seen, therefore, that each of these cross members connecting the oppositely arranged side frame members has near each end two brackets 13 and 22 for selectively positioning a brake lever to act solely as such and a combination brake lever and hanger, respectively. In Figures 1, 2, 3 and 4 the oppositely arranged side frame members 10 and the cross connecting member 12 are integrally formed, and also brackets 13 and 22 are integrally formed with the cross connecting member 12, Figure 4 showing additionally a strengthening member 26 connecting the oppositely arranged side frame members 10 intermediate the ends thereof.

In Figures 5, 6 and 7 I have shown a modification of my invention in which the cross connecting member 27 is not integrally formed with the oppositely arranged side frame members 28, but is secured thereto in any suitable manner, such as by rivets 29, and the brackets 30 and 31 are not integrally formed with the cross connecting member 27 but secured thereto by any suitable means, such as rivets 32. In each case the bracket for supporting the dead brake lever is located laterally with respect to the plane of the associated truck wheel and the other bracket is located in said plane.

It is apparent that there may be various modifications of my invention and it is my intention to cover all such modifications which do not involve a departure from the spirit and scope of the invention as set forth in the following claims.

I claim:

1. In a railway car truck, the combination of oppositely arranged side frames and a member connecting said side frames and being provided with means located substantially at the same level and along the length of said connecting member whereby a lever may be selectively located to act as a brake lever or a combination brake hanger and lever.

2. In a railway car truck, the combination of oppositely arranged side frames, a member connecting said side frames, and brackets located substantially at the same level thereon whereby a brake lever or a combination brake hanger and lever may be selectively mounted.

3. In a railway car truck, the combination of oppositely arranged side frames and a plurality of securing means located at substantially the same level and laterally with respect to each of the side frames whereby brake levers may be selectively supported.

4. In a railway car truck, the combination of oppositely arranged side frames, means connecting said side frames, and a plurality of lever supporting portions located at substantially the same level on said connecting means adjacent each side frame whereby a brake lever may be selectively mounted.

5. In a railway car truck, the combination of oppositely arranged side frames, a member connecting said side frames, and lever supporting means carried by said connecting member on substantially the same level, one in the plane of an associated truck wheel and the other located laterally with respect to said plane.

Signed at Chicago, Illinois, this 14th day of October, 1920.

ARMAND H. PEYCKE.